United States Patent
Edwards, III et al.

(10) Patent No.: US 7,676,606 B1
(45) Date of Patent: Mar. 9, 2010

(54) METHOD AND SYSTEM FOR MONITORING AND CONTROLLING STATUS OF PROGRAMMABLE DEVICES

(75) Inventors: James W. Edwards, III, Austin, TX (US); James P. Stengel, Lago Vista, TX (US)

(73) Assignee: Cisco Technology, Inc., San Jose, CA (US)

( * ) Notice: Subject to any disclaimer, the term of this patent is extended or adjusted under 35 U.S.C. 154(b) by 1381 days.

(21) Appl. No.: 10/131,906

(22) Filed: Apr. 24, 2002

(51) Int. Cl.
*G06F 3/00* (2006.01)

(52) U.S. Cl. .............................. 710/15; 710/8; 710/19; 710/17

(58) Field of Classification Search .................. 709/250, 709/249, 223, 227; 326/46, 99, 93; 370/389, 370/253, 245, 258, 463, 468, 335; 717/173; 713/2, 1; 710/302, 305; 714/28
See application file for complete search history.

(56) References Cited

U.S. PATENT DOCUMENTS

| | | | | |
|---|---|---|---|---|
| 4,796,025 A * | 1/1989 | Farley et al. | ............... | 340/3.51 |
| 4,858,222 A * | 8/1989 | Weimert et al. | ............. | 370/216 |
| 4,964,065 A | 10/1990 | Hicks et al. | .................. | 364/514 |
| 5,291,079 A | 3/1994 | Goetting | ..................... | 307/465 |
| 5,315,580 A * | 5/1994 | Phaal | ......................... | 370/232 |
| 5,363,513 A * | 11/1994 | Blankenburg | .................. | 4/354 |
| 5,734,642 A * | 3/1998 | Vaishnavi et al. | ........... | 370/255 |
| 5,860,002 A * | 1/1999 | Huang | ........................... | 713/2 |
| 5,996,004 A | 11/1999 | White | ........................ | 709/217 |
| 6,256,758 B1 | 7/2001 | Abramovici et al. | ........ | 714/724 |
| 6,298,392 B1 | 10/2001 | White | ........................... | 710/8 |
| 6,351,774 B1 | 2/2002 | White | ......................... | 709/228 |
| 6,480,906 B2 | 11/2002 | White | ........................... | 710/8 |
| 6,532,497 B1 * | 3/2003 | Cromer et al. | ............. | 709/250 |
| 6,550,030 B1 | 4/2003 | Abramovici et al. | ........ | 714/725 |
| 6,566,819 B2 | 5/2003 | Wolff | .......................... | 315/149 |
| 6,574,197 B1 * | 6/2003 | Kanamaru et al. | .......... | 370/252 |
| 6,584,560 B1 * | 6/2003 | Kroun et al. | .................... | 713/2 |
| 6,631,520 B1 * | 10/2003 | Theron et al. | ............... | 717/173 |
| 6,721,872 B1 * | 4/2004 | Dunlop et al. | ................ | 712/28 |
| 6,826,613 B1 * | 11/2004 | Wang et al. | .................. | 709/227 |
| 6,976,239 B1 * | 12/2005 | Allen et al. | .................... | 716/16 |
| 7,142,557 B2 * | 11/2006 | Dhir et al. | .................... | 370/463 |
| 7,246,245 B2 * | 7/2007 | Twomey | ...................... | 713/189 |
| 2002/0133734 A1 * | 9/2002 | Sarathy et al. | ................. | 714/4 |

OTHER PUBLICATIONS

Beeck et al., CRISP: A Template for Reconfigurable Instruction Set Processors, Springer-Verlag Berlin Heidelberg, 2001, pp. 296-305.*
Meier et al., Reconfigurable Optical Gigabit Network Adapter, Proceedings 18th Intern. Conf. On Applied Informatics, Innsbruck, 2000, pp. 1-7.*
Xilinx, XC4000E and XC4000X Series Field Programmable Gate Array, Xilinx, 1997, pp. 4-46 through 4-68.*

\* cited by examiner

*Primary Examiner*—Henry W. H. Tsai
*Assistant Examiner*—Cheng-Yuan Tseng
(74) *Attorney, Agent, or Firm*—Baker Botts L.L.P.

(57) ABSTRACT

A method for programming programmable devices includes monitoring a status pin for each of the programmable devices, maintaining state information for the programmable devices indicating whether each programmable device is programmed, and transitioning each programmable device from a programmed state to an operating state. A monitoring module includes detectors, a memory and a processor. The detectors detect indications on the status pins of programmable devices that the programmable devices are programmed. The memory stores state information about the programmable devices. The processor communicates control signals to the programmable devices instructing them to transition from the programmed state to the operating state.

4 Claims, 3 Drawing Sheets

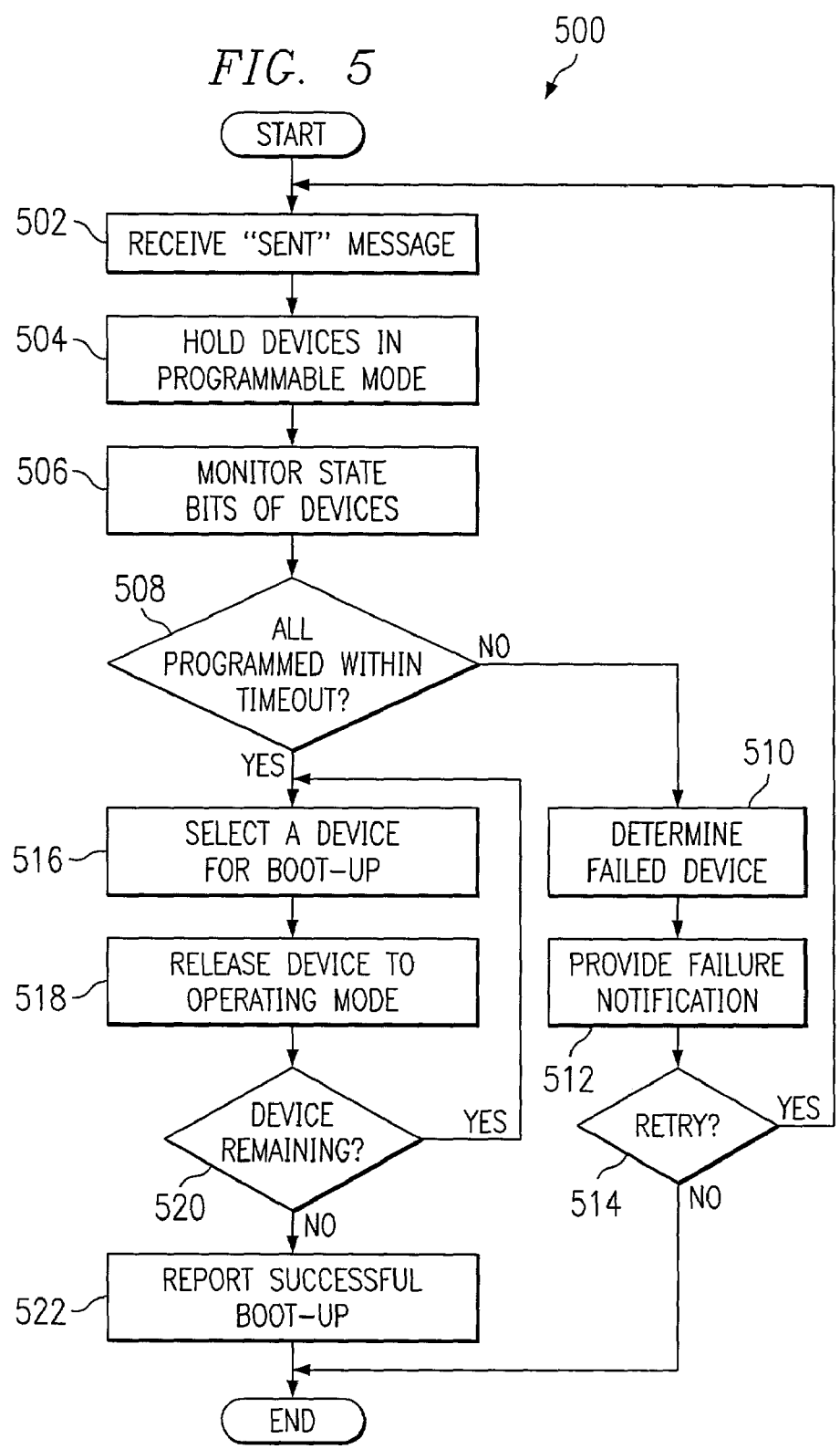

METHOD AND SYSTEM FOR MONITORING AND CONTROLLING STATUS OF PROGRAMMABLE DEVICES

TECHNICAL FIELD OF THE INVENTION

This invention relates generally to programmable devices, and more particularly to a method and system for monitoring and controlling status of programmable devices.

BACKGROUND OF THE INVENTION

Telecommunication and other devices use programmable devices as components for a variety of applications. Often, the architecture of programmable devices and telecommunication components is selected to make the programming process as efficient as possible. But when a programmable device fails, it may be difficult to determine the location of the failure and to replace the failed device. Furthermore, certain architectures are not adaptable to controlling the timing and sequence for when programmable devices transition from a programmable mode to an operating mode.

SUMMARY OF THE INVENTION

In accordance with the teachings of the present invention, the disadvantages and problems associated with configuring programmable devices for serial download have been substantially reduced or eliminated. In a particular embodiment, a method for monitoring status of programmable devices allows a user to identify particular devices in a serial chain that have failed. In another embodiment, a method for controlling download sequencing in a serial collection of programmable devices allows devices to boot up in a predetermined order by controlling the transition of the devices from a programmable state to an operating state.

In one embodiment, a method for programming programmable devices includes monitoring a status pin for each of the programmable devices, maintaining state information for the programmable devices, and transitioning the programmed programmable devices from a programmable state to an operating state. In another embodiment, a method for monitoring status for programmable devices coupled in series includes monitoring a status pin for each of the programmable devices separately during programming. The method also includes maintaining state information for the programmable devices and determining a single point of failure in the series based on the state information.

In yet another embodiment, a monitoring module includes detectors, a memory and a processor. The detectors detect an indication on the status pins of programmable devices that the devices are programmed. The memory stores state information about whether each programmable device is programmed. The processor communicates a control signal instructing the programmable devices to transition to the operating state using the status pins.

In still another embodiment, a method for programming programmable devices includes maintaining state information for programmable devices having a first programmable state, a second programmed state and a third operating state. The method also includes monitoring status pins of the programmable devices and receiving a state signals on the status pins indicating that the programmable devices are programmed. The method further includes updating the state information in response to the state signals.

A technical advantage of certain embodiments of the present invention is individual detection of failures during download. This allows a technician, repair person or other person with access to the system hardware components to replace one or two programmable devices in an array rather than replacing all devices or determine which device to replace by trial and error. Thus, the repair person expends less time and uses fewer replacement parts overall.

Another technical advantage of certain embodiments of the present invention is individually controlling the transition of programmable devices from a programmable state to an operating state. When multiple programmable devices transition to the operating state at one time, the transition may create a power surge or otherwise place stress on the array of programmable devices. Furthermore, depending on the situation, it may be desirable to have certain programmable devices activate first. For example, the user may wish to test particular line cards corresponding to particular programmable devices in the array. In these and other similar cases, techniques for individual control over programmable devices, as provided in certain embodiments of the present invention, afford significant advantages.

Particular embodiments of the present invention may have some, all, or none of the enumerated technical advantages. Additional technical advantages will also be apparent to one skilled in the art from the following figures, description and claims.

BRIEF DESCRIPTION OF THE DRAWINGS

For a more complete understanding of the present invention and its advantages, reference is now made to the following description, taken in conjunction with the accompanying drawings, in which:

FIG. 5 is a flowchart illustrating a method for monitoring download status of programmable devices in a serial chain and controlling the boot-up order of these devices.

DETAILED DESCRIPTION OF THE INVENTION

Figure 1:
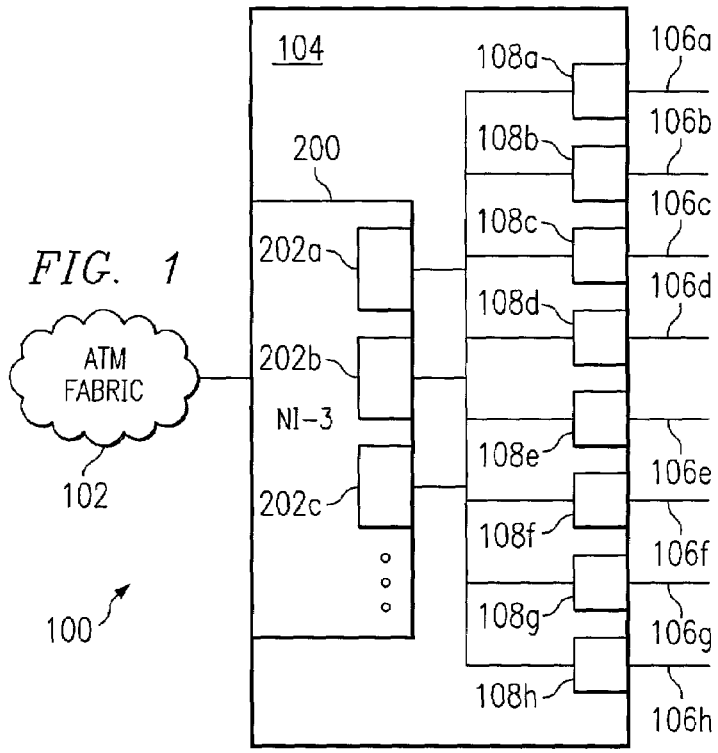
FIG. 1 illustrates a block diagram of a system including a network interface card in accordance with a particular embodiment of the present invention.

FIG. 1 illustrates a telecommunication system 100 that uses field programmable gate arrays (FPGAs) 202 to route information from an asynchronous transfer mode (ATM) network 102 to links 106. FPGAs 202 represent any programmable device that executes programmable logic. Although FIG. 1 depicts one particular example of a device that uses FPGAs 202, numerous other devices use FPGAs 202 as well. In fact, virtually any electronic device may include one or more FPGAs 202 as components. Thus, while the depicted example will be described in detail, it should be understood that the particular techniques described may apply to any collection of programmable devices.

System 100 includes an ATM switch 104 that communicates packets from network 102 to links 106. Switch 104 includes a network interface card 200 and line cards 108. Network 102 represents any collection of hardware and/or software configured to communicate information in the form of packets, cells, segments, frames, or other portions of data (generally referred to as "packets"). Network 102 contemplates any collection of network components including hubs, routers, switches, gateways, or any other suitable component. Network 102 may include the Internet, Extranet, local area network (LAN), wide area network (WAN), public switched telephone network (PSTN), any combination of these elements, or any other suitable method of communicating information. Although network 102 has been depicted as an ATM network 102, it should be understood that any form, protocol, or method of information transfer is suitable for network 102.

Switch 104 represents any hardware and/or software that communicates information from network 102 to links 106. Links 106 represent any port or connection, real or virtual, that conveys information from switch 104 to any appropriate destination. For example, links 106 may represent physical connections to the PSTN, and switch 104 could then receive packets from network 102 and communicate them as analog signals over links 106. Network interface card 200 represents any hardware and/or software in switch 104 that receives information from network 102 and communicates the information to links 106. Line cards 108 represent any component or module of switch 104, including hardware and/or software, coupled to links 106 that receive information from network interface card 200 and communicate the information to links 106.

In operation, switch 104 receives packets from network 102 at network interface card 200. Using FPGAs 202, card 200 routes information to the appropriate line card 108. FPGAs 202 may be used to perform any suitable task for routing information, and may also perform any suitable conversion of information to a suitable format for links 106. FPGAs 202 may receive programming instructions from memory, download them, or otherwise receive them from any other suitable source.

Figure 2:
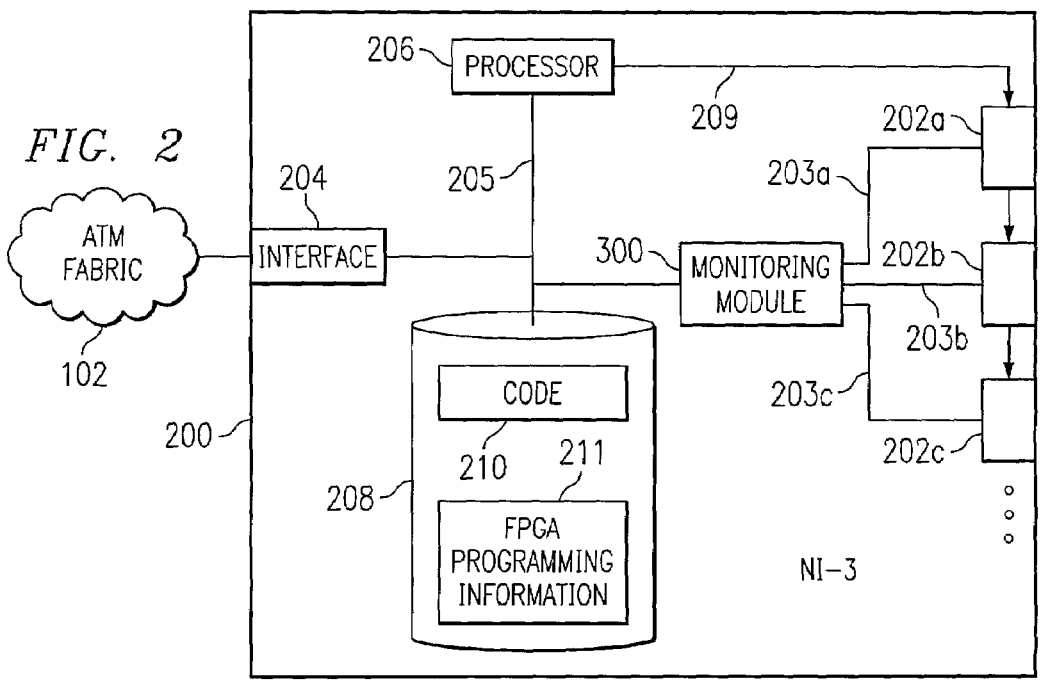
FIG. 2 shows in more detail the network interface card of FIG. 1.

FIG. 2 shows card 200 of FIG. 1 in greater detail. As depicted, card 200 includes FPGAs 202, an interface 204, a processor 206, a memory 208, and a monitoring module 300. Components of card 200 communicate using backplane 205, which represents any hardware and/or software allowing information to be communicated among components of card 200.

FPGAs 202 represent any programmable device. FPGAs 202 may include processors, memory, or any other suitable components allowing FPGAs 202 to execute instructions in the form of software. FPGAs 202 have three states of operation: programmable, programmed and operating. In the programmable state, FPGAs 202 may receive programming instructions from any appropriate source, such as a read-only memory attached to the FPGA 202 or a signal 209 from processor 206.

Once FPGA 202 is programmed, FPGA 202 indicates that FPGA 202 is in the programmed state on a status pin 203. Status pin 203 represents any physical or logical component of FPGA 202 that communicates state signals from FPGA 202 indicating the state of operation of FPGA 202. Status pin 203 may include a physical pin, a virtual connection, a conductive wire, an optical fiber, or any other suitable method for communicating state information in the form of electrical or other suitable form of signal. A particular embodiment of FPGA 202 may indicate that it is programmed by driving status pin 203 with a characteristic voltage, by "tri-stating" or otherwise releasing the voltage of status pin 203, by communicating a message, or by any other suitable indication. FPGA 202 may also use status pin 203 to receive control signals that instruct FPGA 202 to transition from the programmed state to the operating state. For example, FPGA 202 may receive voltage signals on status pin 203 and transition from a programmable state to an operating state when the voltage on status pin 203 transitions from a first voltage to a second voltage.

Interface 204 represents any port or connection, embodied as hardware and/or software that enables card 200 to communicate and exchange information with network 102. Interface 204 also communicates information to FPGAs 202 for later communication to line cards 108 of switch 104. Interface 204 may be coupled to FPGAs 202 and may communicate information to them. Alternatively, interface 204 may communicate information to processor 206, which then may distribute information among FPGAs 202.

Processor 206 represents any hardware and/or software configured to process information. Processor 206 may include microprocessors, microcontrollers, digital signal processors (DSPs), programmable logic, or any other suitable hardware and/or software.

Memory 208 represents any component or components for information storage in card 200. Memory 208 may include magnetic media, optical media, read-only memory (ROM), random access memory (RAM), removable media, CD-ROMs, DVD-ROMs, or any other suitable form of memory, whether volatile or nonvolatile. Memory 208 may represent local components of card 200 and/or remote components accessible by card 200. Memory 208 may represent a single component, but may also represent several components distributed among various locations of card 200. For example, memory 208 may represent a collection of individual memories 208 for FPGAs 202. Memory 208 stores code 210 executed by processor 206 to perform various tasks, such as receiving information from interface, communicating information to FPGAs 202 and other similar tasks. Memory 208 also stores programming instructions 211 for FPGAs 202. FPGAs 202 receive programming instructions 211, which are then used by each FPGA 202 to configure, program, or otherwise prepare itself for operation.

Monitoring module 300 represents any hardware and/or software for detecting the individual status of FPGAs 202 using status pin 203 and for controlling the operating status of FPGAs 202. Monitoring module 300 detects state signals from FPGAs 202 indicating whether each FPGA 202 is programmed, and monitoring module 300 may also communicate control signals to FPGAs 202. For example, monitoring module 300 may drive the status pin 203 of a particular FPGA 202 to a certain voltage in order to transition the FPGA 202 from the programmed state to the operating state.

In operation, processor 206 communicates programming information 211 from memory 208 to FPGAs 202 in the form of a signal 209. FPGAs 202 receive programming information 211 and use programming information 211 to program themselves. In the serial configuration shown, the first FPGA 202a receives the signal 209 and extracts a portion of programming information 211 stored in signal 209 to program itself. Once FPGA 202a is fully programmed, FPGA 202a indicates that it is programmed by releasing status pin 203 or otherwise indicating its status on status pin 203. After it is programmed, FPGA 202a passes programming information 211 received from processor 206 on to the next FPGA 202b in the series. This process is repeated until all of the FPGAs 202 are programmed. During the programming process, monitoring module 300 determines whether there has been a failure in the programming process, and if so, identifies a single point of failure.

Figure 3:
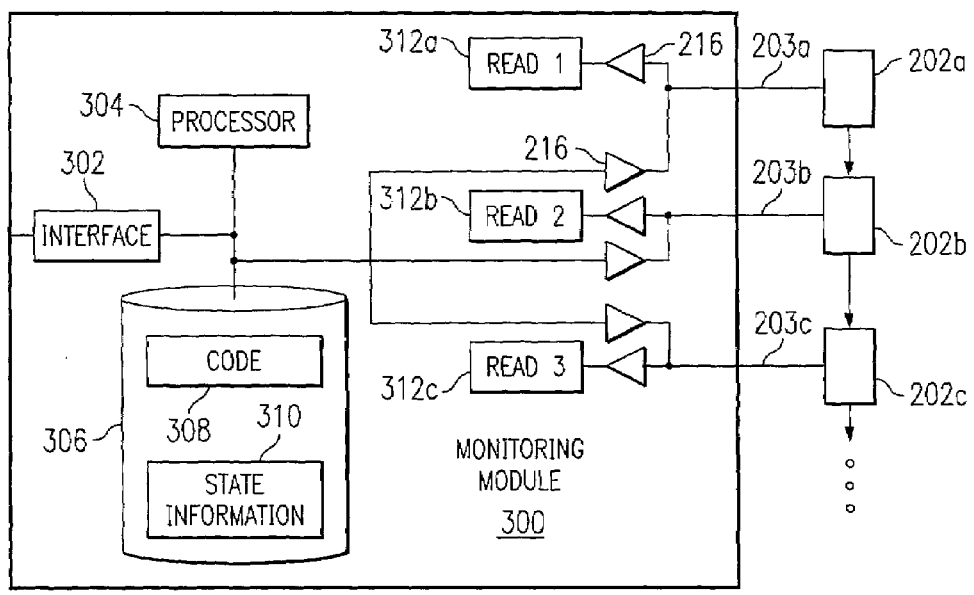
FIG. 3 illustrates a monitoring module in accordance with a particular embodiment of the present invention.

FIG. 3 shows one embodiment of monitoring module 300 in detail. The depicted monitoring module 300 may be part of the card 200 shown in FIG. 2, but may also be used with FPGAs 202 in any other device as well. Monitoring module 300 includes an interface 302, a processor 304, a memory 306, and detectors 312. Interface 304 represents any port or connection, real or virtual, allowing monitoring module 300 to communicate with devices outside monitoring module 300, such as processor 206 of card 200. Processor 304 represents any hardware and/or software configured to process information. Processor 304 may include microprocessors, microcontrollers, digital signal processors (DSPs), programmable logic, or any other suitable hardware and/or software.

Memory 306 represents any component or components for information storage in monitoring module 300. Memory 306 may include magnetic media, optical media, read-only memory (ROM), random access memory (RAM), CD-ROMs, DVD-ROMs, flip-flops, switches, or any other suitable form of memory, whether volatile or nonvolatile. Memory 306 stores code 308 executed by processor 306 to perform various tasks, such as determining the state of operation for one of the FPGAs 202 or generating control signals for FPGAs 202. Memory 306 also stores state information 310 for FPGAs 202. State information 310 indicates whether each FPGA 202 is programmed or not, and may also indicate whether each FPGA 202 is operating.

Detectors 312 represent any suitable hardware and/or software that allows monitoring module 300 to detect status of FPGAs 202. For example, if status pin 203 indicates whether FPGA 202 is programmed by driving status pin 203 to a voltage, then detector 212 may represent a voltmeter or other suitable device for detecting voltage. Diodes or other suitable isolation devices 216 may be used to isolate monitoring module 300 from FPGAs 202, thus preventing potential damage to monitoring module 300 from electrical activity in FPGAs 202.

During the programming process, monitoring module 300 may monitor FPGAs 202 to determine their current state of operation. One particular method of monitoring download status is to connect all of the status pins 203 to a common lead which is connected to a voltage source ($V_{cc}$) by a pull-up resistor. In the programmable state, FPGAs 202 drive their status pins 203 so that the voltage on the common lead is approximately ground or "low." Once each FPGA 202 is programmed, that FPGA 202 stops driving its respective status pin 203 so that the status pin 203 is "tri-stated" or "floating." When all FPGAs 202 release their status pins 203, the pull-up resistor pulls the voltage at the common lead to a "high" value of approximately $V_{cc}$. FPGAs 202 detect the change in voltage on status pins 203 from low to high, and in response to this detection, FPGAs 202 switch from the programmable state to an operating state. One significant drawback of this method is that if a particular FPGA 202 in the series fails to successfully program itself, then that FPGA 202 will not release its status pin 203, and the voltage on the common lead will never go from low to high. Unfortunately, it is not possible to tell which one of the FPGAs 202 failed in that case. Thus, either each FPGA 202 must be replaced and the subsequent components tested or, alternatively, the entire array must be replaced. Because of the additional testing steps required, more FPGAs 202 are typically replaced than are strictly necessary for card 200 to operate. In addition, since FPGAs 202 are automatically driven into the operating state by the change in voltage at the common line, it is not possible to separately transition individual FPGAs 202 from the programmable state to the operating state.

The depicted monitoring module 300 instead monitors status pins 203 of FPGAs 202 separately. Monitoring module 300 maintains state information 310 for each FPGA 202 in memory. This allows monitoring module 300 to detect the particular FPGA 202 in the series that fails to successfully program itself. Thus, an operator can replace a particular one or two of the FPGAs 202, rather than having to either replace all of them or determine which FPGA 202 must be replaced through trial and error.

Because each status pin 203 is coupled to monitoring module 300 separately, monitoring module 300 may separately control each status pin 203. As a result, monitoring module may send control signals, such as voltages, to individual status pins 203 of FPGAs 202. This presents certain advantages over the common lead method in which all FPGAs 202 automatically transition to the operating state when the voltage of the common lead goes high. For example, monitoring module 300 may prevent power surges by transitioning FPGAs 202 into the operating state one at a time rather than all at once. Furthermore, in certain cases, it may be desirable to have the FPGAs 202 boot up in a different order than the one suggested by the serial configuration, and in such cases, monitoring module 300 could implement a particular order of booting up for the FPGAs 202.

Although FIGS. 2 and 3 have depicted a particular implementation of monitoring and controlling techniques for FPGAs 202, this is only one example of a situation in which the techniques may be implemented. In alternative embodiments, monitoring module 300 may perform similar functions in any device that uses FPGAs 202, whether or not the device is a telecommunications device. Monitoring module 300 may be used in a variety of hardware and/or software architectures that use FPGAs 202, and may perform either or both of the monitoring and controlling functions described. Furthermore, monitoring module 300 may be modified to work in configurations other than serial arrangement. For example, in a parallel configuration, where it may be less useful to monitor the download status of individual FPGAs 202, it may still be useful to control the boot-up order for reasons described above, such as preventing power surges during boot up. In such cases, monitoring module 300 may control FPGAs 202 to cause them to boot up in a certain order or at a certain time.

Figure 4:
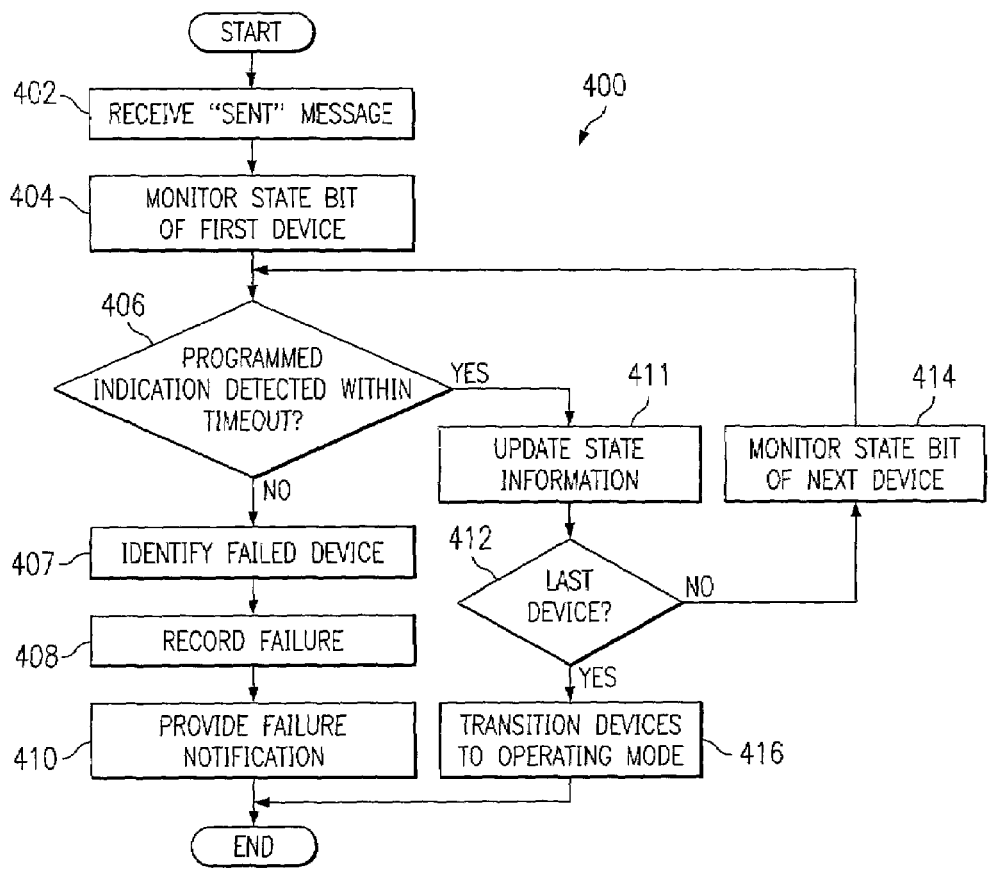
FIG. 4 is a flowchart illustrating a method for monitoring status of programmable devices in a serial chain.

FIG. 4 shows a flowchart 400 illustrating a method for monitoring status of FPGAs 202. In flowchart 400, monitoring module 300 receives a message from processor 206 that signal 209 containing download information for FPGAs 202 has been sent at step 402. Monitoring module 300 monitors status pin 203 of the first FPGA 202a in the series at step 404. At step 406, monitoring module 300 determines whether it has detected an indication on status pin 203 that the monitored FPGA 202 has been successfully programmed within a timeout period. For the first FPGA 202a, the timeout period may be specified as a predetermined amount of time after monitoring module 300 receives the sent message at step 402. For subsequent FPGAs 202 in the series, the specified time period can be measured from the time that monitoring module 300 detects that the preceding FPGA 202 in the series has been programmed. Alternatively, the timeout period may be based on a clock signal generated by processor 206, determined from a schedule stored in memory 306, or calculated in any other suitable fashion.

If a programmed indication is not detected within the timeout period, monitoring module 300 identifies the failed FPGA 202 based on state information 310 at step 407, and records the failure of the particular FPGA 202 in memory 306 at step 408. Monitoring module 300 provides the user with a failure notification at step 410. The user may then use the information in the failure notification to deduce that either the monitored device has failed to successfully download information, or the previous device failed to communicate the information to the failed device. Additionally, monitoring module 300 may monitor signals between FPGAs 202 to determine whether information was communicated between FPGAs 202 successfully. Consequently, the user can replace one or both of these devices, rather than having to replace all of FPGAs 202 or, alternatively, to replace and retest all FPGAs 202 in the array until the faulty FPGA 202 is replaced.

If monitoring module 300 detects a programmed indication within the timeout period at step 406, monitoring module updates state information 310 to reflect that FPGA 202 is now programmed at step 411. Monitoring module 300 may then determine if the programmed FPGA 202 is the last device in the series at step 412. If there are devices in the series that are not yet programmed, monitoring module 300 monitors status pin 203 of the next FPGA 202 in the series at step 414. If all FPGAs 202 have been successfully programmed, monitoring module 300 may transition FPGAs 202 to their operating mode at step 416. Monitoring module 300 may transition devices to operating mode all at once, or may transition them in a particular boot up sequence.

FIG. 5 is a flowchart 500 showing another method for monitoring and controlling the status of FPGAs 202. Monitoring module 300 receives a message at step 502 indicating that information has been sent to FPGAs 202 by processor 206. Monitoring module 300 holds FPGAs 202 in programmable mode at step 504. This step 504 prevents FPGAs 202 from transitioning into operating mode even if they have been successfully programmed, thus allowing monitoring module 300 to control the time and order of boot-up of FPGAs 202. In one embodiment, monitoring module 300 holds the voltage of all but the last status pin 203 low even when a programmed FPGA 202 releases its status pin 203. While holding status pins 203, monitoring module 300 monitors status pins 203 of the last FPGA 202 in the series to determine whether that FPGA 202 has released its status pin 203 at step 506. The last FPGA 202 may be coupled to a pull-up resistor so that the voltage of status pin 203 is pulled high when the last FPGA 202 releases its status pin 203, but this is not necessary for monitoring module 300 to perform its monitoring functions.

Monitoring module 300 waits for a certain time after receiving the sent message from processor 206, and then determines based on the monitoring of status pins 203 whether all FPGAs 202 in the series have been successfully programmed within a timeout period at step 508. The timeout period may be selected based on the number of FPGAs 202 in the series, so that the timeout period represents an approximate amount of time required to program all of the devices. Alternatively, the timeout period may be based on a clock signal from processor 206, a schedule in memory 208, or any other suitable basis for determining a time period. If one or more of the devices have failed to be programmed within the timeout period (based on detecting that the last FPGA 202 is unprogrammed), then at step 510, monitoring module 300 determines the first FPGA 202 in the series that failed to be successfully programmed based on their respective status pins 203. For example, monitoring module 300 may stop driving the status pins 203 to low and detect the FPGAs 202 that are still driving pins 203 low. This would indicate that those FPGAs 202 are not programmed. Monitoring module 300 then provides a user with notification of the failure at step 512. The user may then opt to re-try the download or may replace FPGAs 202 in the series that may have failed at step 514. In such cases, the method may be re-tried with the new components or new configuration at step 502.

If all of the devices are programmed within the timeout period, then monitoring module proceeds to boot up FPGAs 202 by transitioning them into operating mode. Monitoring module selects one of the FPGAs 202 for boot up at step 516 based on a particular boot-up order. The boot-up order may be the same order as the series, but the method is adaptable to any other boot-up order as well. Monitoring module 300 releases the selected FPGA 202 to operating mode at step 518, such as by driving status pin 203 of the selected FPGA 202 to the appropriate voltage for the operating state. Monitoring module 300 determines whether there are any FPGAs 202 remaining to be transitioned into operating mode at step 520, and selects a new device for boot up at step 516 if there are any remaining to be transitioned. Otherwise, monitoring module 300 reports the successful boot up of all devices at step 522.

Although particular methods of monitoring and controlling FPGAs 202 have been described, numerous variations will be apparent to one skilled in the art. For example, devices may be monitored serially, in parallel, simultaneously, or in any other sequence or arrangement. The timeout periods for devices to be programmed may be modified or altered, and it is not even always necessary for there to be a timeout period. In certain embodiments, a user may request status updates rather than monitoring module 300 providing them automatically.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for programming a plurality of programmable devices within a network interface card, comprising:

monitoring, at a monitoring module, a voltage level of a status pin for each one of the plurality of programmable devices, wherein the plurality of programmable devices are coupled as a series of programmable devices to allow a first programmable device of the plurality of programmable devices to use programming information and communicate the programming information to a second programmable device of the plurality of programmable devices and each status pin is coupled to the monitoring module and each status pin is separately monitored by the monitoring module and each programmable device has a programmable state indicating an ability to receive programming instructions and an operating state indicating operation according to the programming instructions, the programmable state and the operating state of each of the plurality of programmable devices being determined by the voltage level of its respective status pin;

detecting whether each of the plurality of programmable devices is driving the status pin to a predetermined voltage indicating corresponding status;

maintaining state information for each of the plurality of programmable devices, the state information indicating whether each of the plurality of programmable devices is programmed;

determining each single point of failure in the series of programmable devices, wherein the single point of failure represents a failed programmable device that is not programmed or is not programmed within a timeout period; and transitioning the programmed programmable devices to the operating state by adjusting the voltage level of each status pin, wherein the programmed programmable devices are separately transitioned to the operating state.

2. The method of claim 1, wherein the step of monitoring comprises:
   determining whether the particular programmable device is programmed based on whether the particular programmable device is driving the status pin.

3. The method of claim 1, wherein the step of transitioning comprises:
   determining a specified order for booting up the programmable devices; and
   transitioning the programmable devices to the operating state in the specified order.

4. The method of claim 1, further comprising:
   determining, by the monitoring module, whether each programmable device is programmed within the timeout period; and
   if a particular programmable device of the plurality of programmable devices is not programmed within the timeout period, determining that the particular programmable device has failed.

* * * * *